(12) United States Patent
Ha et al.

(10) Patent No.: US 10,064,779 B2
(45) Date of Patent: Sep. 4, 2018

(54) WALKING ASSISTANCE APPARATUS AND METHOD OF CONTROLLING THE SAME

(71) Applicant: Samsung Electronics Co., Ltd., Suwon-Si, Gyeonggi-Do (KR)

(72) Inventors: Tae Sin Ha, Seongnam-si (KR); Young Do Kwon, Yongin-si (KR); Youn Baek Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 806 days.

(21) Appl. No.: 14/571,092

(22) Filed: Dec. 15, 2014

(65) Prior Publication Data

US 2015/0164732 A1 Jun. 18, 2015

(30) Foreign Application Priority Data

Dec. 17, 2013 (KR) ........................ 10-2013-0157264

(51) Int. Cl.
*A61H 1/00* (2006.01)
*A61H 3/00* (2006.01)
(Continued)

(52) U.S. Cl.
CPC ............... *A61H 3/00* (2013.01); *A61H 1/024* (2013.01); *A61H 1/0244* (2013.01); *A61H 1/0266* (2013.01); *G05B 15/02* (2013.01); *A61H 2011/005* (2013.01); *A61H 2201/1215* (2013.01); *A61H 2201/1246* (2013.01); *A61H 2201/164* (2013.01); *A61H 2201/165* (2013.01);
(Continued)

(58) Field of Classification Search
CPC .... A61H 2201/2092; A61H 2201/5084; A61H 2201/5079; A61H 2201/5069; A61H 2201/5064; A61H 2201/5061; A61H 2201/50; A61H 2201/1676; A61H 2201/165; A61H 2201/164; A61H 2201/1628; A61H 2201/1623; A61H 2201/1246; A61H 2201/1215; A61H 2011/005; A61H 1/0266; A61H 1/0244; A61H 1/024; A61H 3/00; G05B 15/02
See application file for complete search history.

(56) References Cited

U.S. PATENT DOCUMENTS 8,177,733 B2 * 5/2012 Ashihara ............... A61F 5/0102
600/595
8,251,930 B2 * 8/2012 Ido ........................ A61H 1/0237
601/23
(Continued)

*Primary Examiner* — Glenn Richman
(74) *Attorney, Agent, or Firm* — Harness, Dickey & Pierce, P.L.C.

(57) ABSTRACT

Disclosed herein are a walking assistance apparatus including a drive portion capable of adjusting tension of a fixing portion, and a method of controlling the same. The walking assistance apparatus includes a support portion which applies assist power to assist walking to a human body, a fixing portion which is arranged at one end of the support portion to enclose the human body and fixes the support portion on the human body, a drive portion including at least one motor which adjusts tension of the fixing portion, and a control portion which adjusts a driving direction of the at least one motor during rotation of the support portion in order to prevent the fixing portion from rotating by assist power applied through the support portion.

16 Claims, 12 Drawing Sheets

(51) Int. Cl.
  *G05B 15/02* (2006.01)
  *A61H 1/02* (2006.01)
  *A61H 11/00* (2006.01)
(52) U.S. Cl.
  CPC ............... *A61H 2201/1623* (2013.01); *A61H 2201/1628* (2013.01); *A61H 2201/1676* (2013.01); *A61H 2201/50* (2013.01); *A61H 2201/5061* (2013.01); *A61H 2201/5064* (2013.01); *A61H 2201/5069* (2013.01); *A61H 2201/5079* (2013.01); *A61H 2201/5084* (2013.01); *A61H 2201/5092* (2013.01)

(56) References Cited

U.S. PATENT DOCUMENTS

| | | | |
|---|---|---|---|
| 9,011,354 B2* | 4/2015 | Angold | A61H 1/0255 601/34 |
| 9,351,855 B2* | 5/2016 | Swift | A61F 2/68 |
| 9,610,208 B2* | 4/2017 | Kazerooni | B25J 9/0006 |
| 2006/0211956 A1* | 9/2006 | Sankai | A61B 5/04888 601/5 |

* cited by examiner (a)

(b)

WALKING ASSISTANCE APPARATUS AND METHOD OF CONTROLLING THE SAME

CROSS-REFERENCE TO RELATED APPLICATION

This application claims the benefit of Korean Patent Application No. 10-2013-0157264, filed on Dec. 17, 2013 in the Korean Intellectual Property Office, the entire disclosure of which is incorporated herein by reference.

BACKGROUND

1. Field

Example embodiments relate to a walking assistance apparatus and/or a method of controlling the same.

2. Description of the Related Art

A walking assistance apparatus may assist a user in walking so that the user more easily walks. A user may be have trouble walking for innate reasons, such as genetic defects, or acquired reasons such as diseases or accidents. Accordingly, the walking assistance apparatus may reduce the user's trouble walking.

The walking assistance apparatus may include, for example, a walking assistance vehicle equipped with at least one wheel and a support and/or a walking assistance robot which applies force required to walk to muscles of the human body so as to assist a user in walking.

The walking assistance robot may be fixed to a hip part, a femoral part, or a shin part of the human body. The walking assistance robot may apply force, assisting motion of a muscle and joint, such as torque by an actuator and various mechanical means so as to assist motion of the muscle and joint. Therefore, a user may more easily walk by assistance of the walking assistance robot.

SUMMARY

Example embodiments provide a walking assistance apparatus and/or a method of controlling the same. In some example embodiments, the walking assistance apparatus may include a drive portion capable of adjusting tension of a fixing portion.

Additional aspects of the example embodiments will be set forth in part in the description which follows and, in part, will be obvious from the description, or may be learned by practice of the example embodiments.

In accordance with some example embodiments, a walking assistance apparatus includes a support portion which applies assist power to assist walking to a human body, a fixing portion which is arranged at one end of the support portion to enclose the human body and fixes the support portion on the human body, a drive portion including at least one motor which adjusts tension of the fixing portion, and a control portion which adjusts a driving direction of the at least one motor during rotation of the support portion in order to prevent the fixing portion from rotating by assist power applied through the support portion.

In accordance with other example embodiments, in a method of controlling a walking assistance apparatus including a support portion which applies assist power to a human body, a fixing portion which is arranged at one end of the support portion to enclose the human body and fixes the support portion on the human body, and a drive portion including at least one of motors which are installed to both ends of the fixing portion to adjust tension of the fixing portion, the method includes determining a rotation direction of the support portion, and adjusting a driving direction of the at least one motor during rotation of the support portion in order to prevent the fixing portion from rotating by assist power applied through the support portion.

BRIEF DESCRIPTION OF THE DRAWINGS

These and/or other aspects of the example embodiments will become apparent and more readily appreciated from the following description of some of the example embodiments, taken in conjunction with the accompanying drawings of which.

DETAILED DESCRIPTION

Figure 1:
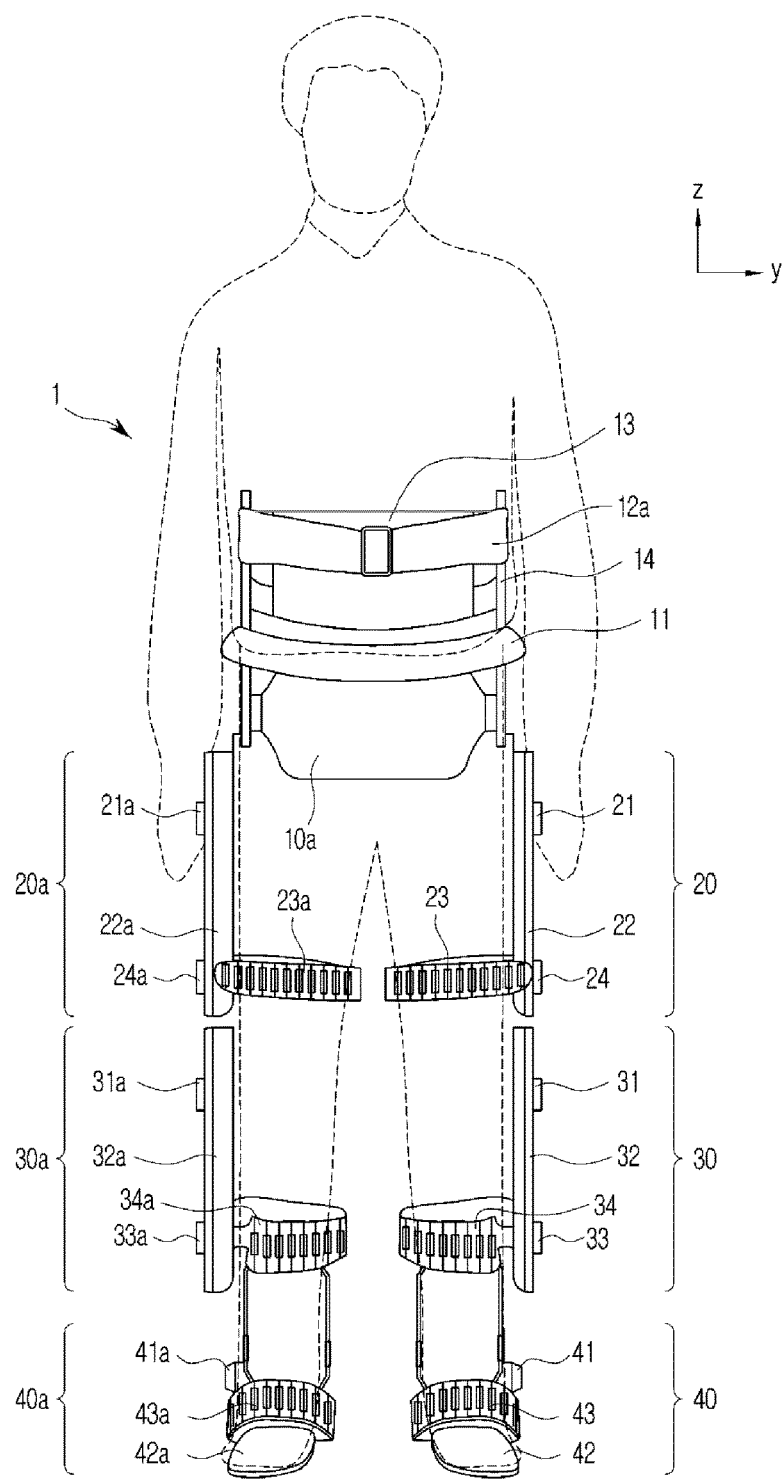
FIG. 1 is a front view illustrating a walking assistance apparatus according to some example embodiments.

Reference will now be made in detail to a walking assistance apparatus according to the example embodiments, some examples of which are illustrated in the accompanying drawings, wherein like reference numerals refer to like elements throughout.

In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Example embodiments may be embodied in many alternate forms and should not be construed as limited to only those set forth herein.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Figure 2:
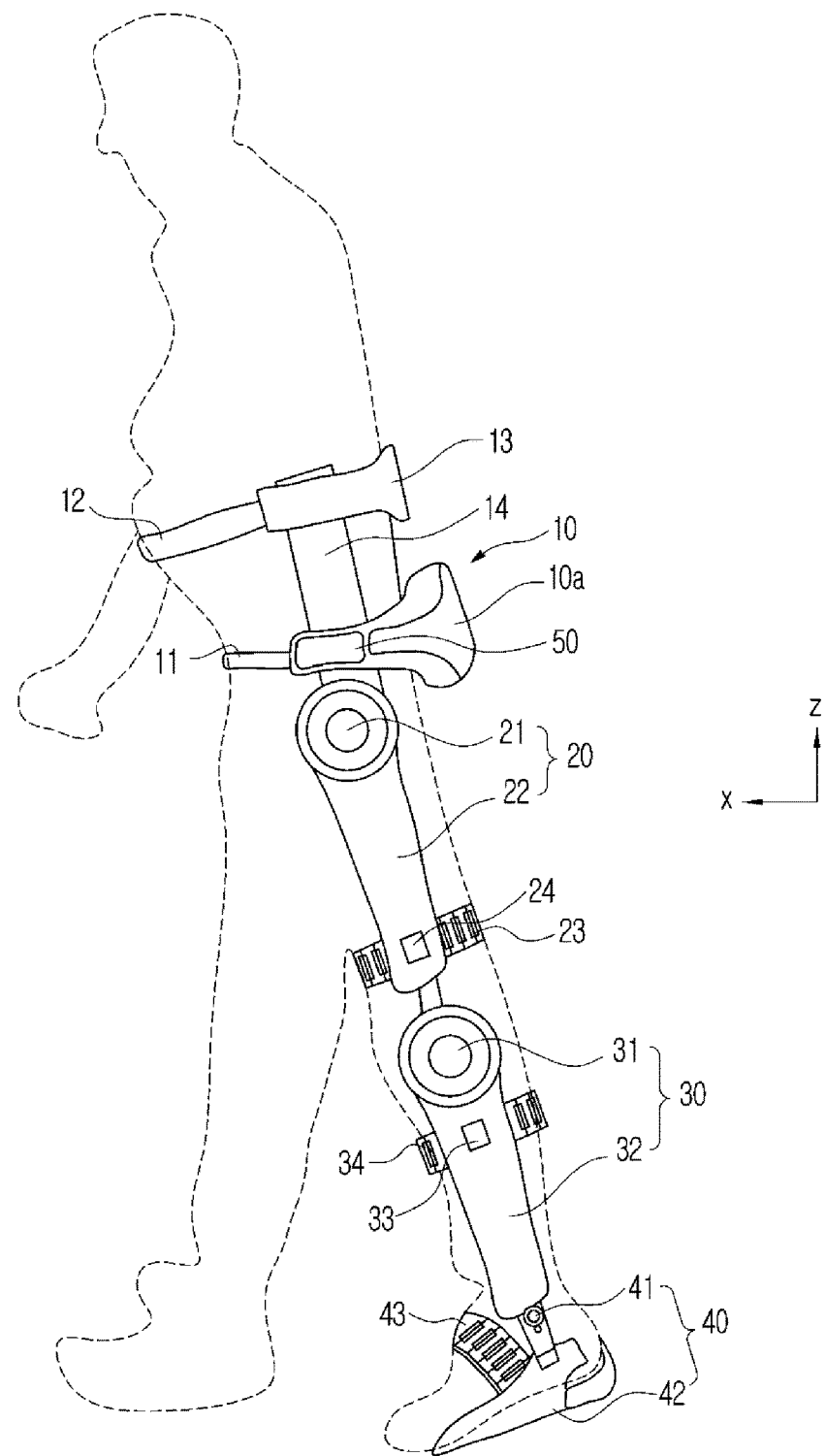
FIG. 2 is a side view illustrating the walking assistance apparatus according to some example embodiments.
Figure 3:
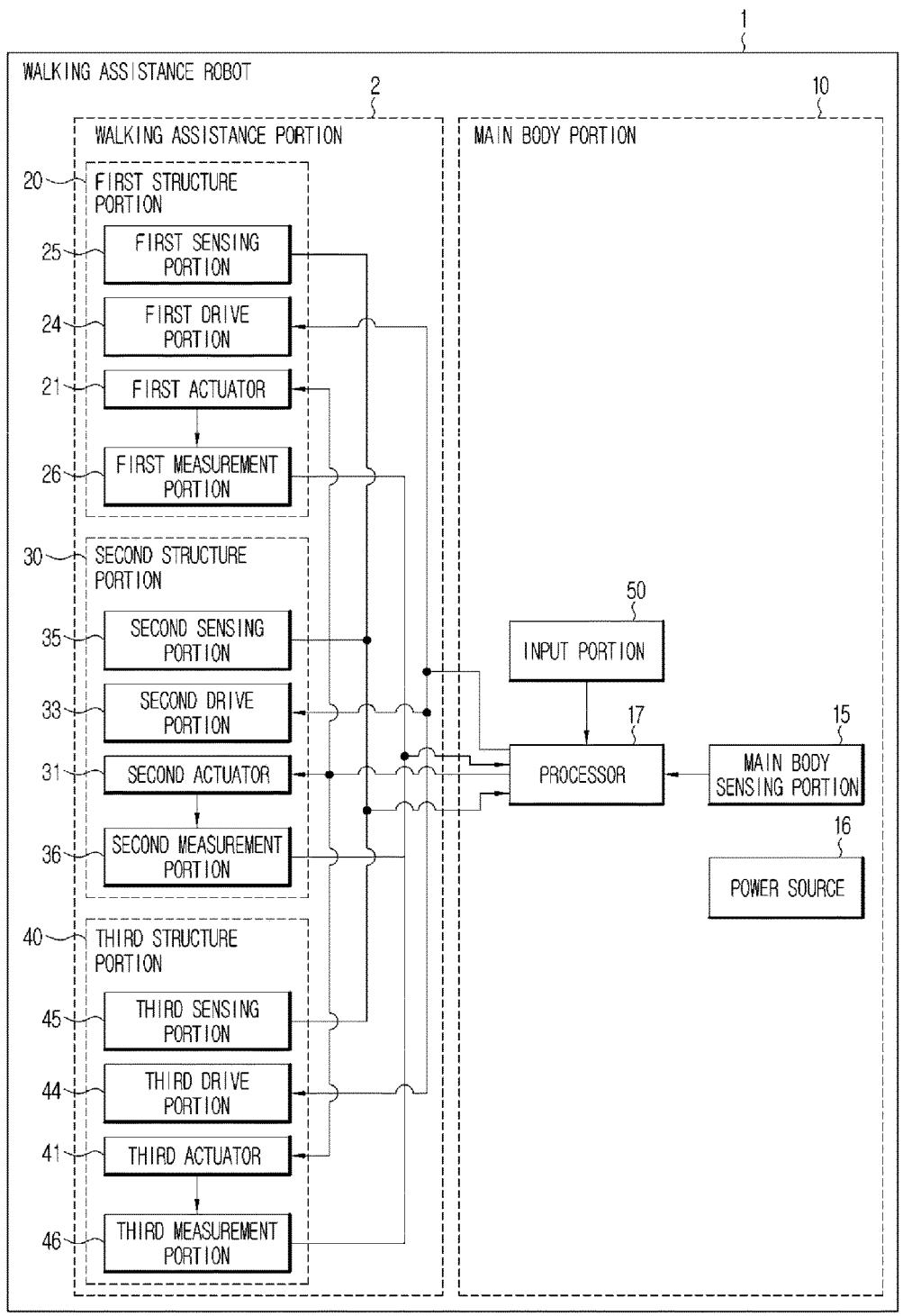
FIG. 3 is a block diagram illustrating a configuration of the walking assistance apparatus according to some example embodiments.
Figure 4:
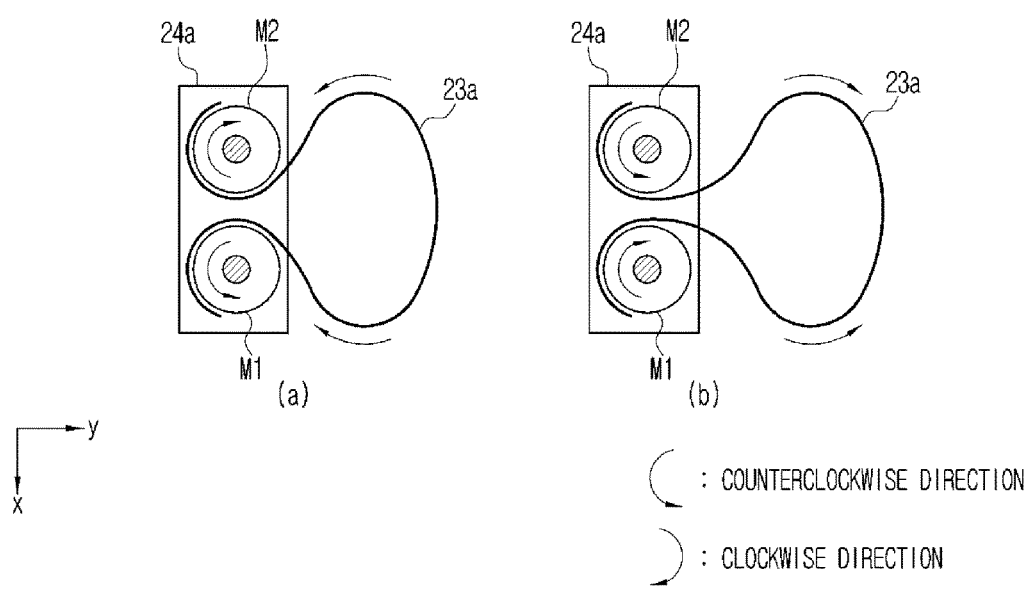
FIG. 4 is a view schematically illustrating a configuration of a drive portion in the walking assistance apparatus.

FIG. 1 is a front view illustrating a walking assistance apparatus according to some example embodiments. FIG. 2 is a side view illustrating the walking assistance apparatus according to some example embodiments. FIG. 3 is a block diagram illustrating a configuration of the walking assistance apparatus according to some example embodiments. FIG. 4 is a view schematically illustrating a configuration of a drive portion in the walking assistance apparatus.

As shown in FIGS. 1 to 3, a walking assistance apparatus 1 may include a walking assistance portion 2 which may be fixed to a user's leg or foot to assist a user's walking and a main body portion 10 which controls the walking assistance portion 2.

The walking assistance portion 2 may include at least one of a first structure portion 20a, a second structure portion 30a, and a third structure portion 40a. Hereinafter, a description will be given of a case in which the walking assistance apparatus 1 includes all of the first to third structure portions 20a, 30a and 40a, however, example embodiments are not limited thereto.

At least one of the first to third structure portions 20, 30 and 40 may be worn on any one of a user's left and right legs. In some example embodiments, the walking assistance portion 2 may include a pair of first structure portions 20 and 20a, a pair of second structure portions 30 and 30a, and a pair of third structure portions 30 and 30a such that the walking assistance portion 2 may mounted to both of a user's left and right legs, as shown in FIG. 1. In a case in which the walking assistance portion 2 includes the pair of first structure portions 20 and 20a, the pair of second structure portions 30 and 30a, and the pair of third structure portions 30 and 30a, functions or operations of the respective structure portions 20, 30 and 40 are substantially similar to each other. In accordance with other example embodiments, the walking assistance portion 2 may also include a structure portion in a single form and structure portions in a paired form, among the plural structure portions 20, 30 and 40. For example, the walking assistance portion 2 may include a pair of first structure portion 20 and 20a, a single second structure portion 30a, and a single third structure portion 40a.

Hereinafter, although the first to third structure portions 20, 30 and 40 will be described with reference to single first to third structure portions 20a, 30a and 40a, the description may be similarly applied to the paired structure portions.

First Structure Portion

The first structure portion 20a may assist movement of a femoral part and a hip joint of the human body during a user's walking. The first structure portion 20a may include at least one first actuator 21a and at least one first support portion 22a.

The first actuator 21a generates torque according to a control command transferred from a processor 17 of the main body portion 10 so that the torque may be applied to the first support portion 22a. When the torque is applied to the first support portion 22a, the first support portion 22a may rotate in at least one direction. A rotation range of the first actuator 21a may be within an operation range of a user's hip joint.

In accordance with some example embodiments, the first actuator 21a may also include a motor which generates torque according to electrical energy supplied from a power source 16 of the main body portion 10. The motor may also be a motor having an encoder. In accordance with other example embodiments, the first actuator 21a may also include at least one piston or cylinder device which generates torque by electrical energy or fluid pressure, such as hydraulic pressure or pneumatic pressure, supplied from the main body portion 10. In accordance with some example embodiments, the actuator 21a may also include all of at least one motor and at least one piston or cylinder device.

At least one first support portion 22a may be connected to the first actuator 21a to rotate in at least one direction according to torque generated by the first actuator 21a. The first support portion 22a may be embodied in various forms. For example, the first support portion 22a may be embodied as at least one support panel. In addition, the first support portion 22a may be embodied by a plurality of joints and links joining the plural joints. Here, the plural joints may be embodied as a support or a support panel. The first support portion 22a may be equipped with at least one first fixing portion 23a. The first support portion 22a may be fixed inside or outside the user's femoral part through the first fixing portion 23a. The fixing portion 23a may be referred to as a clamp.

The first support portion 22a may apply torque generated by the first actuator 21a to the user's femoral part through the first fixing portion 23a. Specifically, when the first support portion 22a rotates along with driving of the first actuator 21a, the user's femoral part fixed to the first support portion 22a by the first fixing portion 23a may rotate in a direction equal to the first support portion 22a. In other words, the first structure portion 20a may apply torque to the user's femoral part or hip joint so as to assist operation of the human body such as lifting or lowering of the femoral part. Thus, when the user takes action such as walking or lifting legs thereof, the user may receive assistance by assist power provided from the walking assistance apparatus 1.

The first fixing portion 23a may also be made of a metal material or an elastic material such as rubber. The first fixing portion 23a may be embodied in a chain form as shown in FIG. 1, in a band form having elastic force, or in a strap form. In addition, various fixing means may be provided as an example of the first fixing portion 23a so long as fixing the first support portion 22a to the femoral part.

In order for torque, which is generated by the first actuator 21a and is applied to the user through the first support portion 22a, to be properly transferred to the user, the first fixing portion 23a is provided to enclose and tighten around the user's leg as shown in FIG. 1. Since physical features of a user vary and muscles frequently expand and contract, force tightening around the user's leg by the first fixing portion 23a should be adjusted. When the force tightening around the user's leg by the first fixing portion 23a is too strong, it is difficult to wear the walking assistance apparatus for a long time due to inconvenience such as having no feeling in the user's leg. On the other hand, when the force tightening the user's leg by the first fixing portion 23a is too weak, proper assist power may not be applied thereto.

The walking assistance apparatus includes a first drive portion 24a which adjusts tension of the first fixing portion 23a such that the first fixing portion 23a may adjust force tightening the user's leg.

As shown in FIG. 1, the first drive portion 24a may be arranged on an outside surface of the user's leg, similarly to installation of the actuator. As shown in FIG. 4, the first drive portion 24a may include one or more of a first motor M1 and a second motor M2 which are respectively arranged at both ends of the first fixing portion 23a. As shown in FIG. 4, the first drive portion 24a adjusts tension of the first fixing portion 23a in such a manner that the first and second motors M1 and M2 arranged at both ends of the first fixing portion 23a pull or release the first fixing portion 23a according to driving directions thereof. Each of the first and second motors M1 and M2 may be arranged to be driven about an axis in an upward and downward direction, namely, parallel to the z-axis as a drive axis. More specifically, when the first and second motors M1 and M2 rotate in a direction of pulling the first fixing portion 23a as shown in FIG. 4(a), force tightening the user's leg by the first fixing portion 23a is increased, thereby allowing the first support portion 22a to be further fixed to the user's leg. In a case in which both ends of the first fixing portion 23a are connected to the first and second motors M1 and M2 as shown in FIG. 4, when the first motor M1 rotates in a counterclockwise direction and the second motor M2 rotates in a clockwise direction as shown in FIG. 4(a), both ends of the first fixing portion 23a are pulled toward the first drive portion 24a by rotation of the first and second motors M1 and M2, thereby allowing the first fixing portion 23a to tighten the user's leg with more strong force. When the force tightening the user's leg by the first fixing portion 23a is increased, torque through the first support portion 22a is properly applied to the user's leg.

When the first and second motors M1 and M2 rotate in a direction of releasing the first fixing portion 23a, force tightening the user's leg by the first fixing portion 23a is decreased, thereby allowing the extent to which the first support portion 22a is fixed to the user's leg to be weakened. When the first motor M1 rotates in the clockwise direction and the second motor M2 rotates in the counterclockwise direction as shown in FIG. 4(b), both ends of the first fixing portion 23a are released from the first drive portion 24a, thereby allowing the force by which the first fixing portion 23a tightens the user's leg to be weakened.

As described above, when the first fixing portion 23a excessively tightens the user's leg, the user's inconvenience is caused. Therefore, in some example embodiments, the first fixing portion 23a is instructed to tighten the user's leg such that the user does not feel inconvenience when torque is transferred to the user's leg. When torque generated by the first actuator 21a is applied through the first support portion 22a in this state, the first fixing portion 23a rotates in a state of being mounted to the user's leg.

Figure 5:
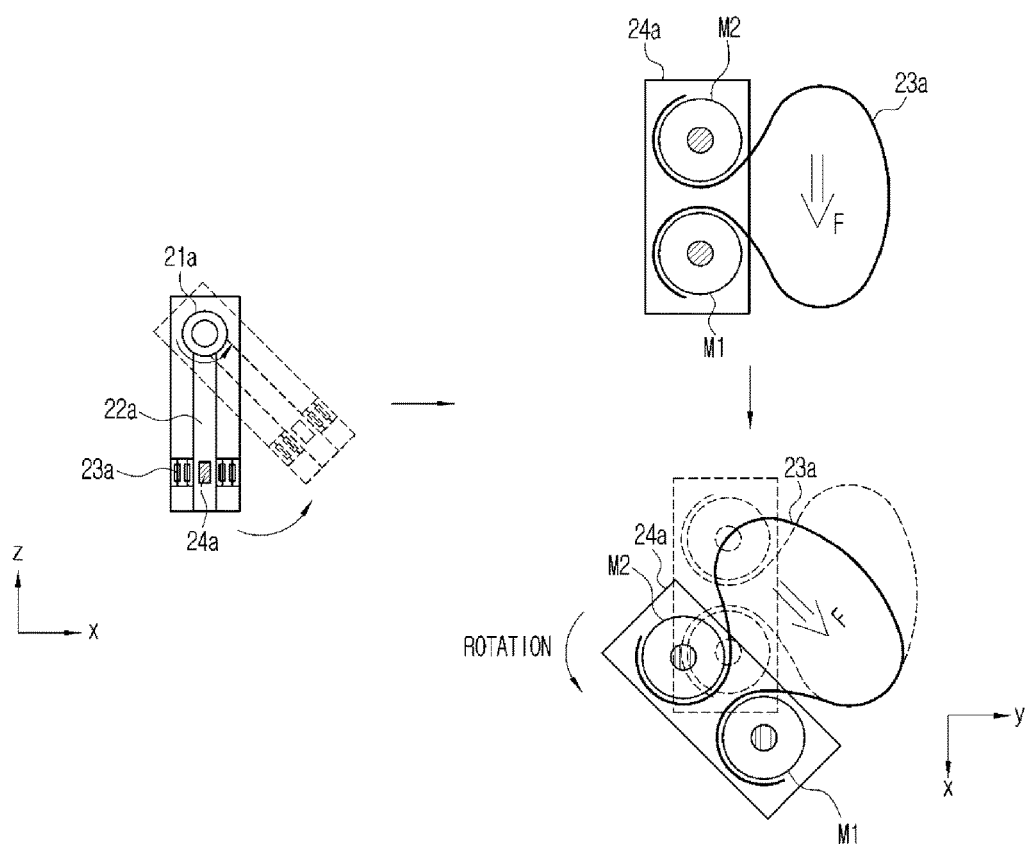
FIGS. 5 and 6 are views schematically illustrating rotation of a fixing portion according to driving of an actuator in the walking assistance apparatus.
Figure 6:
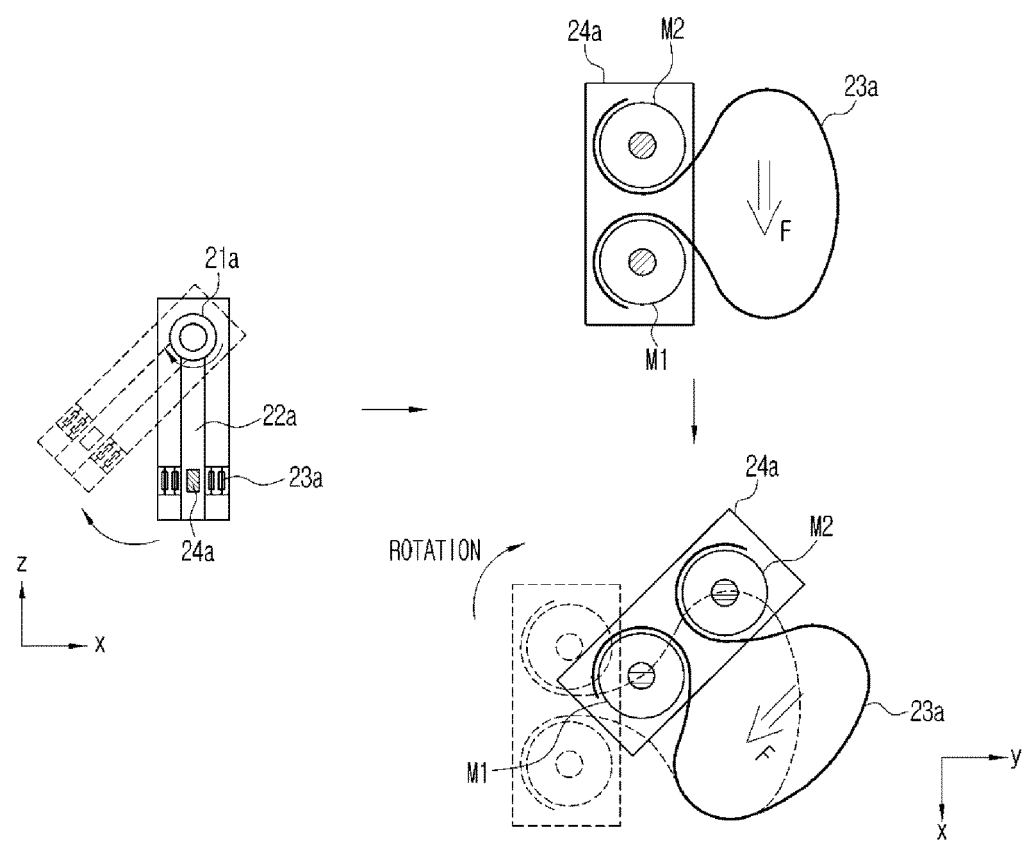

FIGS. 5 and 6 are views schematically illustrating rotation of the fixing portion according to driving of the actuator in the walking assistance apparatus.

As shown in FIGS. 5 and 6, when the first support portion 22a rotates in a direction of lifting or lowering the user's leg, the first fixing portion 23a rotates by lifting or lowering force of the first support portion 22a. An angle of rotation of the first fixing portion 23a is inversely proportional to force by which the first fixing portion 23a tightens the user's leg. When the first fixing portion 23a rotates, a direction of force lifting the user's leg by the first fixing portion 23a may change from a direction of force lifting the user's leg, as shown in FIGS. 5 and 6.

That is, as shown in FIGS. 5 and 6, force which should act in an x-axis direction is changed from an x-axis direction to a y-axis direction. When the direction of force lifting the user's leg changes, the user's leg may not be correctly lifted or lowered. Consequently, the user's leg is lifted or lowered in a warped state. Conventionally, when the first fixing portion 23a rotates by rotation of the first support portion 22a in a state of being worn on the user's leg, the user may receive a portion of the assist power in an undesired direction and not receive the full assist power in a direction coincident with a walking direction, thereby causing inconvenience to walk.

In contrast, in one or more example embodiments, the walking assistance apparatus is configured to adjust driving force and driving directions of the first and second motors M1 and M2 of the first drive portion 24a so as to offset rotation of the first fixing portion 23a.

Figure 7:
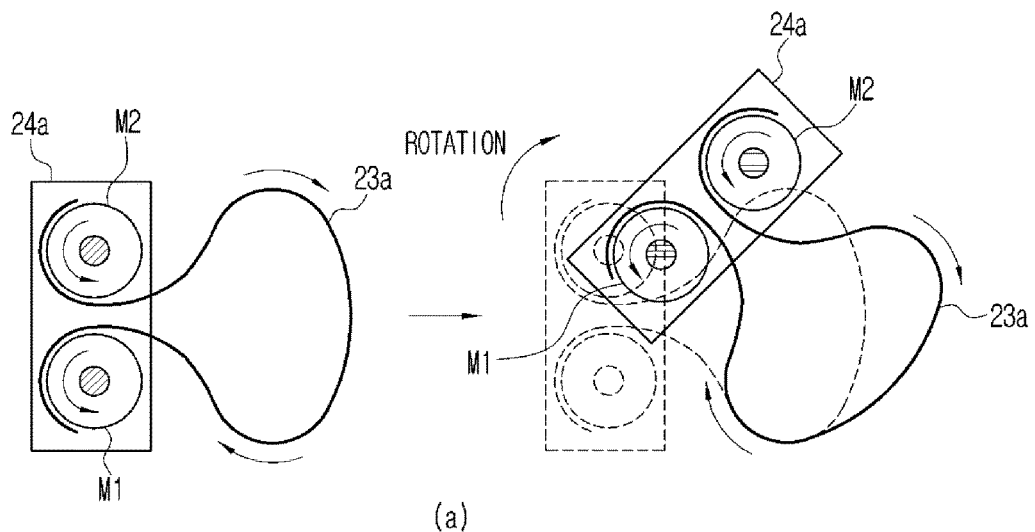
FIG. 7 is a view schematically illustrating rotation of the fixing portion according to driving of the drive portion in the walking assistance apparatus.
Figure 7:
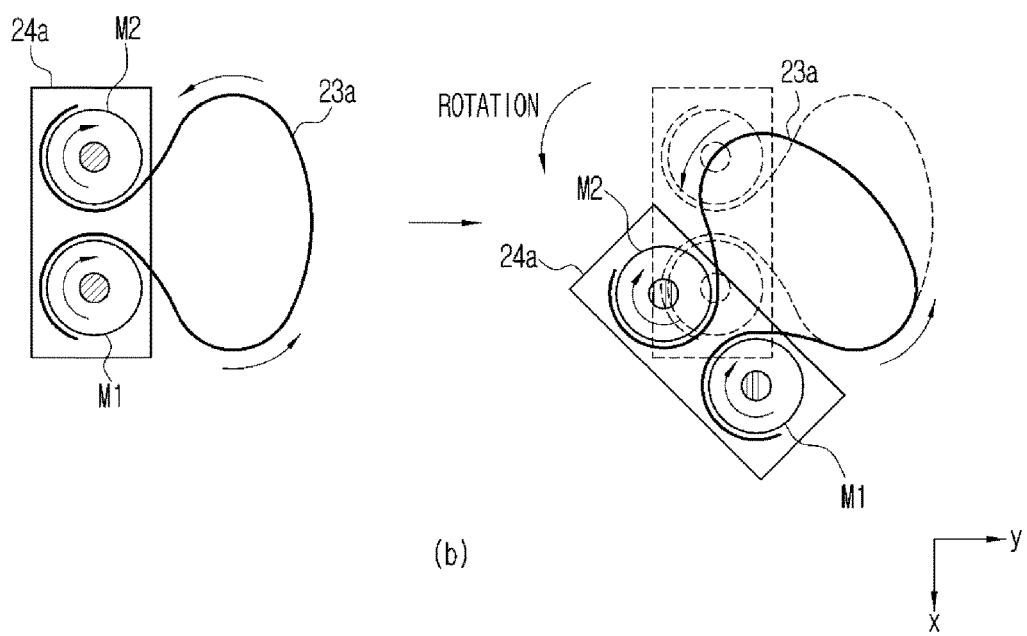

FIG. 7 is a view schematically illustrating rotation of the fixing portion according to driving of the drive portion in the walking assistance apparatus.

When one motor of the first drive portion 24a rotates in a direction of pulling the first fixing portion 23a and the other motor rotates in a direction of releasing the first fixing portion 23a, the first fixing portion 23a is wound toward the motor pulling the first fixing portion 23a. As shown in FIG. 7(a), when all of the first and second motors M1 and M2 rotate in the counterclockwise direction on the drawing, the first motor M1 pulls the first fixing portion 23a and the second motor M2 releases the first fixing portion 23a, thereby allowing the first fixing portion 23a to be wound toward the first motor M1. When the first fixing portion 23a is wound toward the first motor M1 by pulling force of the first motor M1, the first fixing portion 23a rotates in the clockwise direction in a state of being worn on the user's leg.

In addition, as shown in FIG. 7(b), when all of the first and second motors M1 and M2 rotate in the clockwise direction on the drawing, the first motor M1 releases the first fixing portion 23a and the second motor M2 pulls the first fixing portion 23a, thereby allowing the first fixing portion 23a to be wound toward the second motor M2. When the first fixing portion 23a is wound toward the second motor M2 by pulling force of the second motor M2, the first fixing portion 23a rotates in the counterclockwise direction in a state of being worn on the user's leg.

As such, when the driving directions of the first and second motors M1 and M2 of the first drive portion 24a are adjusted, the first fixing portion 23a rotates according to the driving directions of the first and second motors M1 and M2.

Therefore, this enables rotation of the first fixing portion 23a to be offset during walking assistance.

Figure 8:
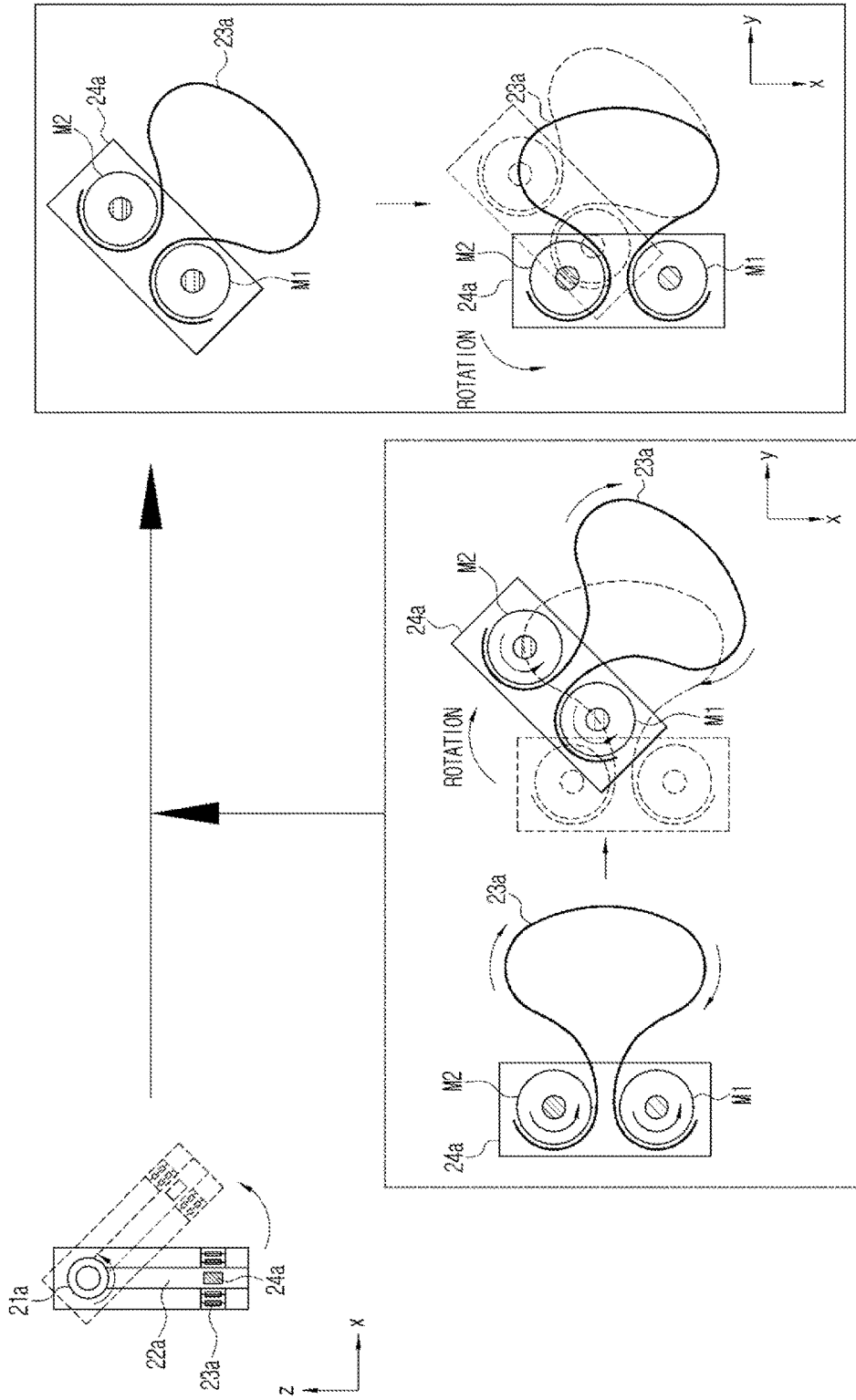
FIGS. 8 and 9 are views schematically illustrating how rotation of the fixing portion according to driving of the actuator is offset through driving of the drive portion.
Figure 9:
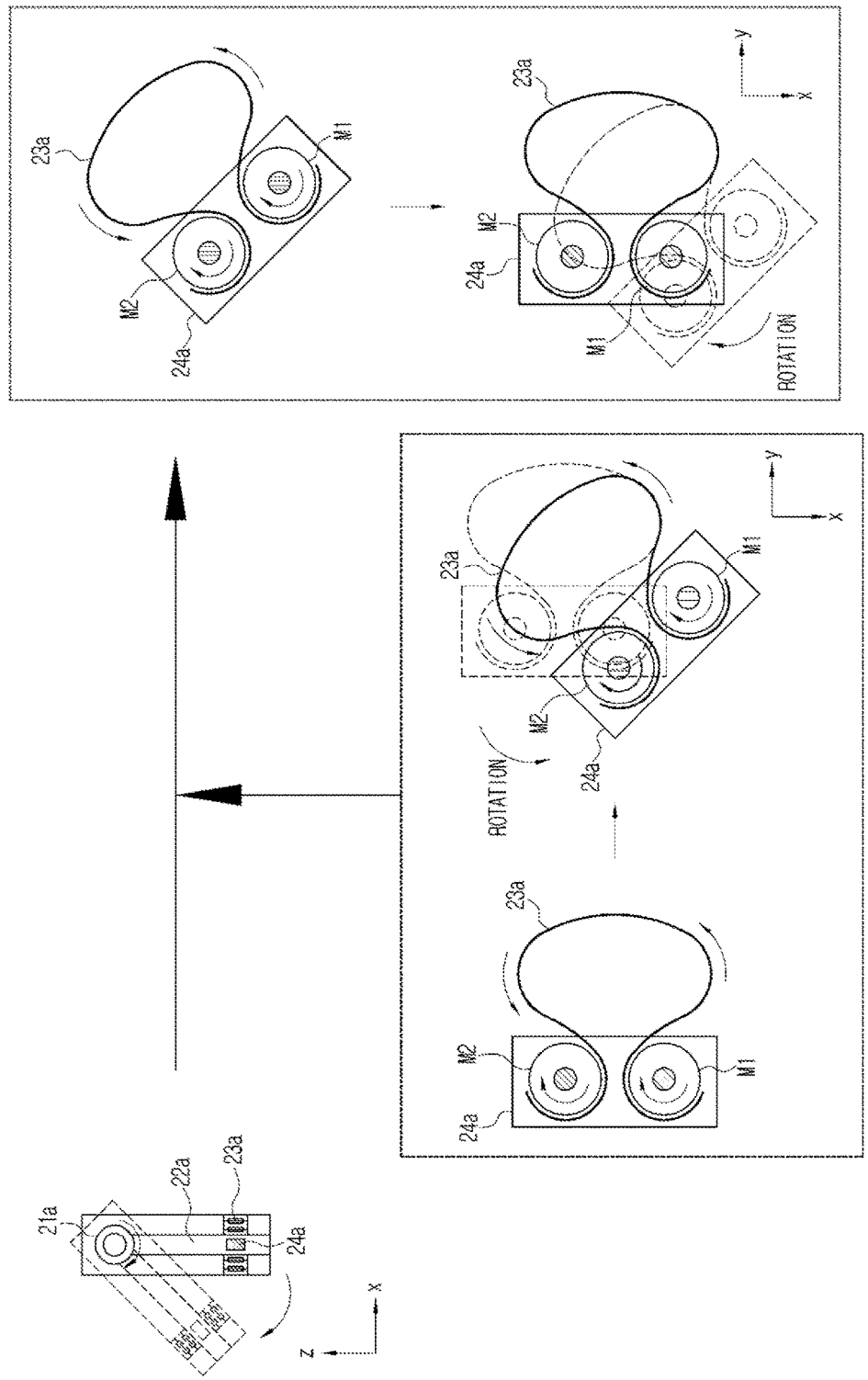

FIGS. 8 and 9 are views schematically illustrating how rotation of the fixing portion according to driving of the actuator is offset through driving of the drive portion.

As shown in FIG. 8, when torque generated by the first actuator 21a acts in a direction of lifting the user's leg, the first fixing portion 23a rotates in the counterclockwise direction. The first fixing portion 23a rotates in left and right directions, namely, rotates about a y-axis as a rotary axis by driving of the first actuator 21a.

In order to offset undesired rotation of the first fixing portion 23a, the processor 17 may rotate the first fixing portion 23a in the clockwise direction by adjusting the driving directions of the motors of the first drive portion 24a, as shown in FIG. 8.

More specifically, when torque generated by the first actuator 21a acts in a direction of lifting the user's leg, all of the first and second motors M1 and M2 of the first drive portion 24a are driven in the counterclockwise direction by a certain angle. When all of the first and second motors M1 and M2 are driven in the counterclockwise direction, the first motor M1 pulls the first fixing portion 23a and the second motor M2 releases the first fixing portion 23a, thereby allowing the first fixing portion 23a to be wound toward the first motor M1. Accordingly, the first fixing portion 23a rotates in the clockwise direction. Since the first fixing portion 23a rotates in the clockwise direction by the first drive portion 24a, rotation of the first fixing portion 23a in the counterclockwise direction is offset. The rotation directions of the first and second motors M1 and M2 may be determined in connection with the rotation direction of the first actuator 21a and the angle of rotation thereof may be determined in connection with an angle of rotation of the first fixing portion 23a by rotation of the actuator.

The first actuator 21a typically generates torque to lift the user's leg in order to swing the user's leg, and generates torque in an opposite direction thereof in a state in which the user's leg rests on the ground.

As shown in FIG. 9, when the user's leg is lowered by the first actuator 21a, the first fixing portion 23a rotates in a direction opposite to the direction of FIG. 8. Therefore, the driving directions of the first and second motors M1 and M2 to offset rotation of the first fixing portion 23a are opposed to those of FIG. 8.

When torque generated by the first actuator 21a acts in a direction of lowering the user's leg, the first fixing portion 23a rotates in the clockwise direction. In order to offset undesired rotation of the first fixing portion 23a, the processor 17 rotates the first fixing portion 23a in the counterclockwise direction by adjusting the driving directions of the motors of the first drive portion 24a, as shown in FIG. 9.

For example, when torque generated by the first actuator 21a acts in a direction of lowering the user's leg, all of the first and second motors M1 and M2 of the first drive portion 24a are driven in the clockwise direction by a certain angle. When all of the first and second motors M1 and M2 are driven in the clockwise direction, the second motor M2 pulls the first fixing portion 23a and the first motor M1 releases the first fixing portion 23a, thereby allowing the first fixing portion 23a to be wound toward the second motor M2. Accordingly, the first fixing portion 23a rotates in the counterclockwise direction. When the first support portion 22a lowers the user's leg, the first fixing portion 23a rotates in the clockwise direction as described above. In this case, since the first fixing portion 23a also rotates in the counter-clockwise direction by the first drive portion 24a, rotation of the first fixing portion 23a in the clockwise direction is offset.

Although the first support portion 22a and the first fixing portion 23a to transfer torque generated by the first actuator 21a have been described, such a description may be similarly applied to actuators, support portions, and fixing portions belonging to the other structure portions of the walking assistance apparatus.

As shown in FIG. 3, the first structure portion 20a may include at least one first sensing portion 25. The first sensing portion 25 may sense at least one of operations of the first actuator 21a, first support portion 22a, and user's hip joint. The first sensing portion 25 may generate electrical signals corresponding to the sensed operations so as to acquire information related to walking. The information related to walking may include at least one of an angle of the joint, a gradient of the first support portion 22a, an angular velocity of the joint, and an acceleration of the joint. The information acquired from the first sensing portion 25 may be transferred to the processor 17, as shown in FIG. 3.

The first sensing portion 25 may include, for example, at least one of a joint angle sensor, a gradient sensor, an acceleration sensor, and an IMU (inertial measurement unit). The first sensing portion 25 may be installed to at least one of the first actuator 21a and the first support portion 22a. In accordance with some example embodiments, the first sensing portion 25 may also be installed to both of the first actuator 21a and the first support portion 22a. In addition, a portion of the first sensing portion 25 may be installed to the first actuator 21a and the other portion may also be installed to the first support portion 22a. For example, the joint angle sensor may also be installed to the first actuator 21a and the gradient sensor or the IMU may also be installed to the first support portion 22a.

Further, as shown in FIG. 3, the first structure portion 20a may include at least one first measurement portion 26. The first measurement portion 26 may be connected to the first actuator 21a to acquire information related to the operation of the first actuator 21a. The information related to the operation of the first actuator 21a may include at least one of a rotation angle, an angular velocity, an angular acceleration of rotation of the first actuator 21a. When the first actuator 21a is a motor having an encoder, the first measurement portion 26 may measure an angle, a velocity, and an acceleration of the joint using an encoder value. Parameters measured by the first measurement portion 26 may be transferred to the processor 17, as shown in FIG. 3.

Second and Third Structure Portions

The second structure portion 30a may assist movement of a lower leg part and a knee joint of the human body during a user's walking. The second structure portion 30a may include a second actuator 31a, a second support portion 32a, and a second fixing portion 34a, as shown in FIGS. 1 to 3.

The second actuator 31a may generate torque similarly to the first actuator 21a. In addition, the second actuator 31a may include at least one of a motor and a piston or cylinder device, and the motor may include an encoder.

The second support portion 32a may rotate according to torque generated by the second actuator 31a. The configurations, structures, and materials of the second support portions 32 and 32a may be similar to those of the above-mentioned first support portions 22 and 22a.

The second structure portion 30a may also include at least one second fixing portion 34 or 34a which fixes the second support portion 32a to the user's lower leg part. The second support portion 32a may be fixed inside or outside the user's lower leg part by the second fixing portion 34 or 34a. The configuration, structure, and material of the second fixing portion 34 or 34a may be similar to those of the first fixing portion 23a.

The second support portion 32a may apply torque generated by the second actuator 31a to the user's lower leg part or knee joint through the second fixing portion 34a. Specifically, when the second support portion 32a rotates along with driving of the second actuator 31a, the user's lower leg part or knee joint fixed to the second support portion 32a by the second fixing portion 34a may rotate in a direction equal to the second support portion 32a. In other words, the second structure portion 30a may apply torque to the user's lower leg part or knee joint so as to assist operation of the user such as lifting or lowering of the lower part. Thus, when the user takes action such as walking or lifting legs thereof, the user may receive assistance by assist power provided from the walking assistance apparatus 1. The walking assistance apparatus includes a second drive portion 33a which adjusts tension of the second fixing portion such that the second fixing portion adjusts force tightening the user's leg. Since the second drive portion 33a is similar to the first drive portion 24a, duplicate description will be omitted.

As shown in FIG. 3, the second structure portion 30a may include at least one second sensing portion 35. At least one second sensing portion 35 may sense at least one of operations of the second actuator 31a, second support portion 34a, and user's knee joint, convert the operations into electrical signals, and transfer the electrical signals to the processor 17, as shown in FIG. 3. The second sensing portion 35 may include at least one of a joint angle sensor, a gradient sensor, an acceleration sensor, and an IMU. The second sensing portion 35 may be installed to at least one of the second actuator 31a and the second support portion 32a. Similarly to the first sensing portion 25, a portion of the second sensing portions 35 may be installed to the second actuator 31a and the other portion may also be installed to the second support portion 32a.

In accordance with some example embodiments, the second structure portion 30a may include at least one second measurement portion 36, as shown in FIG. 3. At least one second measurement portion 36 may acquire information related to the operation of the second actuator 31a. The information related to the operation of the second actuator 31a may include at least one of a rotation angle, an angular velocity, an angular acceleration of rotation of the second actuator 31a. When the second actuator 31a is a motor having an encoder, the second measurement portion 36 may measure an angle, a velocity, and an acceleration of the joint using an encoder value. Parameters measured by the second measurement portion 36 may be transferred to the processor 17, as shown in FIG. 3.

The third structure portion 40a may assist movement of an ankle of the human body during a user's walking. The third structure portion 40a may include a third actuator 41a, a foot support portion 42, and a third fixing portion 43a, as shown in FIG. 1.

The third actuator 41a may generate torque similarly to the first actuator 21a and assist user's operations related to an ankle joint and a muscle in the vicinity of the ankle. The third actuator 41a may include at least one of a motor and a piston or cylinder device, similarly to the first and second actuator 21a and 31a, and the motor may include an encoder.

The foot support portion 42 may support a user's sole.

The third fixing portion 43a may fix the user's foot seated on the foot support portion 42 to the foot support portion 42. The configuration, structure, and material of the third fixing portion 43a may be similar to those of the first fixing portion 23a or the second fixing portion 34a. The walking assistance apparatus includes a third drive portion 44 which adjusts tension of the third fixing portion such that the third fixing portion adjusts force tightening the user's leg.

As shown in FIG. 3, the third structure portion 40a may include at least one third sensing portion 45. The third sensing portion 45 may sense at least one of operations of the third actuator 41a and user's ankle joint. The third sensing portion 45 may include at least one of a joint angle sensor, a gradient sensor, an acceleration sensor, and an IMU. Meanwhile, the third sensing portion 45 may also include a pressure sensor. The pressure sensor may be installed to the foot support portion 42. The pressure sensor may sense a user's weight so as to sense whether or not the user wears the walking assistance apparatus 1 or the user rises. In addition, the pressure sensor may be a GRF (ground reaction force) sensor which may sense GRF transferred to the user's foot during the user's walking. The signals generated according to sensing of the third sensing portion 45 may be transferred to the processor 17, as shown in FIG. 3.

In addition, the third structure portion 40a may include at least one third measurement portion 46, as shown in FIG. 3. At least one third measurement portion 46 may acquire information related to the operation of the third actuator 41a and transfer the measured information to the processor 17. When the third actuator 41a is a motor having an encoder, the third measurement portion 46 may measure an angle, a velocity, and an acceleration of the joint using an encoder value.

Main Body Portion

The main body portion 10 may control the operation of the walking assistance portion 2 or acquire information related to walking. Moreover, the main body portion 10 may support a user's upper body so as to assist the user in stably wearing the walking assistance apparatus 1.

As shown in FIGS. 1 and 2, the main body portion 10 may include a housing 10a which may be equipped with a variety of components to control the walking assistance apparatus 1 and an input portion 50 through which commands related to the operations of the walking assistance apparatus 1 may be input. The housing 10a may be equipped with the main body sensing portion 15, the power source 16, the processor 17, and/or a printed circuit board on which a variety of semiconductor chips may be mounted. The housing 10a of the main body portion 10 may safely protect the equipped components or stably fix the components.

As illustrated in FIG. 1, the main body portion 10 may further include a first waist fixing portion 11 and a second waist fixing portion 12. The first and second waist fixing portions 11 and 12 may fix the housing 10a to a user's waist. For example, the first waist fixing portion 11 may be connected to the housing 10a and the second waist fixing portion 12 may be connected to the first waist fixing portion 11. Each of the first and second waist fixing portions 11 and 12 may also be made of a metal material or an elastic material such as rubber. Each of the first and second waist fixing portions 11 and 12 may be embodied in a chain form, in a band form having elastic force, or in a strap form of various types. In addition, various fixing means may be provided so long as fixing the housing 10a to the user's waist or hip part. The main body portion 10 may further include a first waist support portion 13 to support the user's waist. The first waist support portion 13 may be designed in a shape corresponding to the user's waist in order to support the user's waist. As shown in FIG. 1, the first waist support portion 13 may be connected to the housing 10a by a second waist support portion 14.

As shown in FIG. 3, the main body portion 10 may include the main body sensing portion 15, the power source 16, the processor 17, and the input portion 50.

The main body sensing portion 15 may senses operations of the user so as to acquire various types of information related to the operations. For example, the main body sensing portion 15 may sense a walking velocity of the user and the like. The main body sensing portion 15 may include at least one of a velocity sensor, a gradient sensor, an acceleration sensor, an IMU, and a position measurement system such as a GPS (Global Positioning System).

The power source 16 may supply power to various components within the housing 10a or components of the respective actuators 21a, 31a, and 41a of the walking assistance portion 2. The power source 16 may be built in the housing 10a. The power source 16 may be a primary battery or a secondary battery. The primary battery may include at least one of a mercury battery, a manganese battery, an alkaline battery, and a lithium battery. The secondary battery may include a nickel-cadmium battery, a nickel-hydride battery, a lead acid, a lithium ion battery, a lithium polymer battery, and the like.

The processor 17 may determine operation states of the hip joint, knee joint, and ankle joint or operation states of the actuator 21a, 31a, and 41a corresponding to the respective joints, based on information transferred from the first to third sensing portions 25, 35, and 45 and the first to third measurement portions 26, 36, and 46. In addition, the processor 17 may generate control signals to control the walking assistance apparatus, based on determination on the operation states of the joints or actuators 21a, 31a, and 41a corresponding to the joints.

The processor 17 may be equipped with an arithmetic/logic unit, a register, a program counter, a command decoder, a digital signal processor, a microcomputer, a field programmable array, a programmable logic unit, a microprocessor, or a control circuit on at least one silicon chip. The processor 17 may be embodied by at least one semiconductor chip arranged on the printed circuit board built in the housing 10a.

Figure 12:
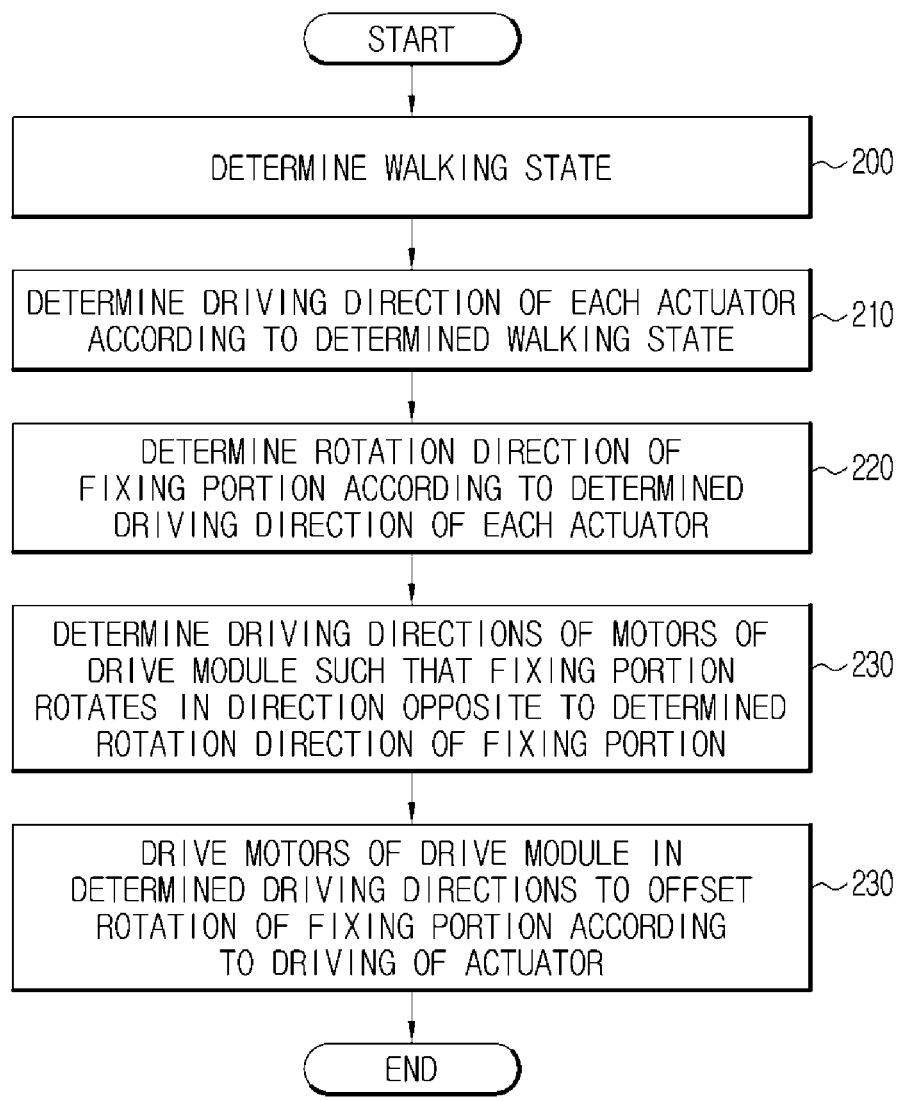
FIG. 12 is a flowchart illustrating a method of controlling a walking assistance apparatus.

The processor 17 may be programmed with instructions that configure the processor 17 as a special purpose computer to perform the operations illustrated in FIG. 12. For example, the processor 17 may instruct motors M1, M2 of the drive portion 24 to rotate in a direction so as to offset the rotation of the fixing portion 23. Further, the processor 17 may estimate operations of the joints by calculating a dynamical model between the user and the walking assistance apparatus, based on information related to operations transferred from the respective measurement portions 26, 36, and 46.

The instructions may be stored on a non-transitory computer readable medium. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion.

In accordance with some example embodiments, the processor 17 may estimate operations of the joints based on a desired (or, alternatively, a predetermined) walking model.

Figure 10:
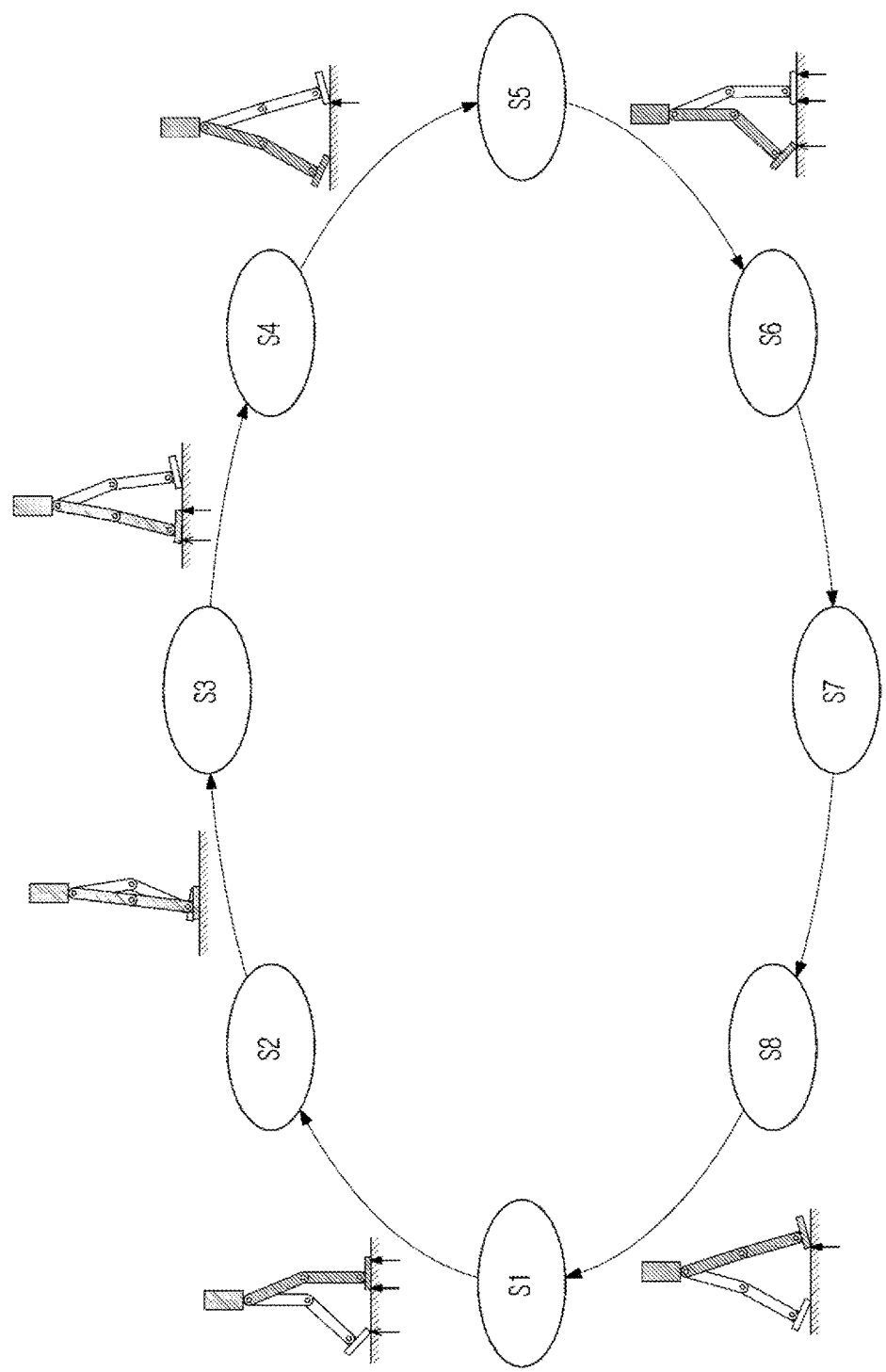
FIGS. 10 and 11 are views for explanation of a walking model according to some example embodiments.
Figure 11:
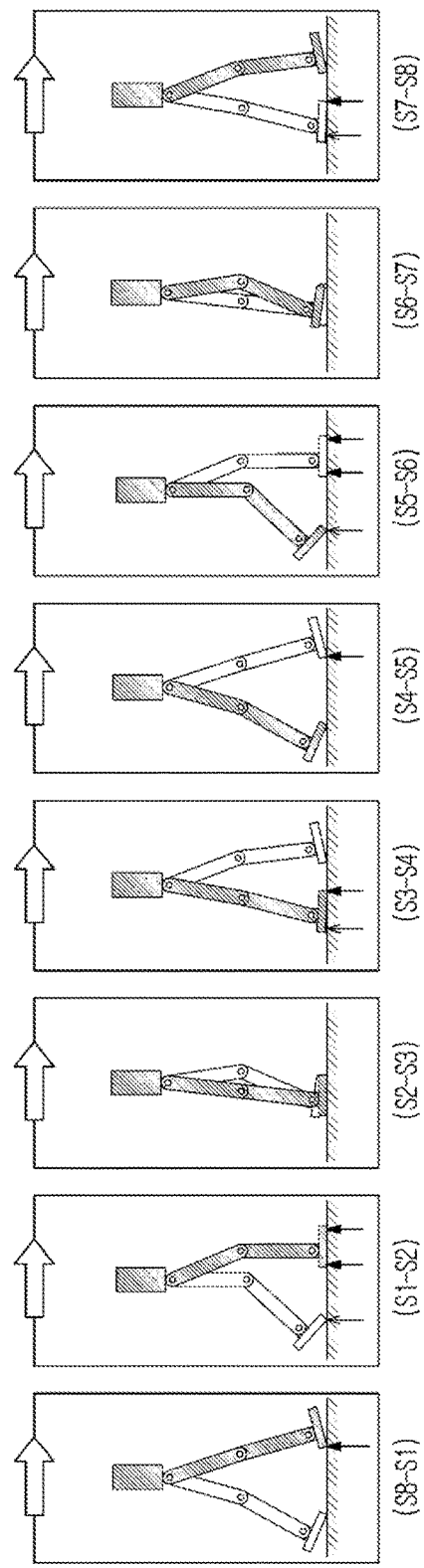

FIGS. 10 and 11 are views for explanation of a finite state machine model as an example of a walking model according to some example embodiments.

As shown in FIG. 10, the walking may be divided into eight stages S1 to S8.

In a first stage S1 of walking, the right leg is in an LR (loading response state) and the left leg is in a PSw (pre-swing state). In a process in which transition from an eighth stage S8 of walking to the first stage S1 of walking is generated, the heel of the right foot may come into contact with the ground as shown in FIGS. 10 and 11. On the other hand, the toe of the left foot may come into contact with the ground and the heel of the left foot may be spaced apart from the ground (S8-S1).

In a second stage S2 of walking, the right leg is in an MSt (mid stance state) and the left leg is in an ISw (initial swing state). In a process in which transition from the first stage S1 of walking to the second stage S2 of walking is generated, the toe and the heel of the right foot simultaneously come into contact with the ground and the left leg begins to swing. The heel of the left leg is first spaced apart from the ground and the toe thereof may be spaced apart from the ground after the heel is spaced apart from the ground (S1-S2).

In a third stage S3 of walking, the right leg is still in the MSt and the left leg is in an MSw (mid swing state). In a process in which transition from the second stage S2 of walking to the third stage S3 of walking is generated, all of the toe and the heel of the right foot come into contact with the ground and the left leg continues to swing. The right foot and the left foot may be located at an adjacent distance (S2-S3).

In a fourth stage S4 of walking, the right leg is in a TSt (terminal stance state) and the left leg is in a TSw (terminal swing state). When transition from the third stage S3 of walking to the fourth stage S4 of walking is generated, the heel of the right foot begins to be spaced apart from the ground. On the other hand, the toe of the right foot may still come into contact with the ground. Meanwhile, the left foot is maintained in a state in which the left foot does not come into contact with the ground (S3-S4).

In a fifth stage S5 of walking, on the contrary to the first stage S1 of walking, the left leg is in the LR and the right leg is in the PSw. When transition from the fourth stage S4 of walking to the fifth stage S5 of walking is generated, the heel of the left foot may come into contact with the ground. Meanwhile, the toe of the right foot may come into contact with the ground and the heel of the left foot may be spaced apart from the ground (S4-S5).

In a sixth stage S6 of walking, the left leg is in the MSt and the right leg is in the LR. When transition from the fifth stage S5 of walking to the sixth stage S6 of walking is generated, the toe and the heel of the left foot may simultaneously come into contact with the ground. The right leg may begin to swing while the toe of the right leg is spaced apart from the ground (S5-S6).

In a seventh stage S7 of walking, the left leg is still in the MSt and the right leg is in the MSw. In a process in which transition from the sixth stage S6 of walking to the seventh stage S7 of walking is generated, all of the toe and the heel of the left foot come into contact with the ground and the right leg continues to swing (S6-S7).

In an eighth stage S8 of walking, the left leg is in the TSt and the right leg is in the TSw. In a process in which transition from the seventh stage S7 of walking to the eighth stage S8 of walking is generated, the right foot is maintained in a state in which the right foot does not come into contact with the ground and the heel of the left foot begins to be spaced apart from the ground. On the other hand, the toe of the right foot may still come into contact with the ground (S3-S4).

The above-mentioned first to eighth stages S1 to S8 may be continuously repeated during walking.

When transition (S1 to S8) of the walking stages is generated during walking, the at least one measurement portions 26, 36, or 46 may measure and collect information related to the operation of at least one joint. The at least one measurement portions 26, 36, or 46 may measure information related to the operation of the joint at a specific point of time in the transition processes (S1 to S8). In accordance with some example embodiments, the at least one measurement portions 26, 36, or 46 may measure information related to the operations of the joints at a plurality of specific points of time in one transition process and acquire an average value or a mid value of information of the plural types.

Specifically, the at least one measurement portions 26, 36, or 46 may collect information related to the operation of at least one joint, corresponding to the at least one measurement portions 26, 36, or 46, among the user's plural joints. In addition, the at least one measurement portions 26, 36, or 46 may collect information related to the operation of at least one actuator, corresponding to the at least one measurement portions 26, 36, or 46, among the first to third actuators 21a, 31a, and 41a so as to collect information related to the operation of at least one joint. In this case, the information measured by the measurement portions 26, 36, or 46 may include at least one of an angle of the joint, an angular velocity of the joint, an angular acceleration of the joint, a walking velocity of the walking assistance apparatus 1, and GRF. The information measured by the at least one measurement portions 26, 36, or 46 may be directly transferred to the processor 17 or may be transferred to the processor 17 after being temporarily or non-temporarily stored in a storage device.

In accordance with some example embodiments, the at least one measurement portions 26, 36, or 46 may also measure and collect information related to the operation of at least one joint in all transition processes. In accordance with other example embodiments, the at least one measurement portions 26, 36, or 46 may also collect information related to the operation of at least one joint only in a partial transition process. For example, the at least one measurement portions 26, 36, or 46 may also measure and collect information related to the operation of at least one joint only in the first transition process (S8-S1) to fourth transition process (S3-S4) of FIG. 10.

In some example embodiments, when the at least one measurement portions 26, 36, or 46 measures and collects information related to the operation of at least one joint, time information of a measured point of time may also be transferred to the processor 17, together with other information.

The processor 17 may calculate and estimate the operations of the joints using time information of points of time measured by the measurement portions 26, 36, and 46 and information measured by the measurement portions 26, 36, and 46. In this case, the estimated operations of the joints may be used to determine an operation state of at least one joint in the following walking process. For example, the operations of the joints estimated in the first to fourth transition processes (S1 to S4) may be used to determine an operation state of at least one joint in the fifth stage of walking to the eighth stage of walking (S5 to S8).

The processor 17 may estimate information related to the operation of the joint and information related to the operation of the joint between the measured plural points of time using a predetermined interpolation. In this case, the estimated information related to the operation of the joint may include an angle of the joint, an angular velocity of the joint, and an angular acceleration of the joint.

The processor 17 may calculate torque of at least one joint based on at least one value measured by at least one of the first to third measurement portions 26, 36, and 46. In this case, various parameters, such as an angle of the joint, an angular velocity of the joint, and an angular acceleration of the joint, of the operation of at least one joint measured by the first to third measurement portions 26, 36, and 46 may be used to calculate torque of at least one joint.

As described above, the processor 17 may determine operation states of the hip joint, knee joint, and ankle joint or operation states of the actuator 21a, 31a, and 41a corresponding to the respective joints, based on information transferred from the first to third sensing portions 25, 35, and 45 and the first to third measurement portions 26, 36, and 46. In order to prevent undesired rotation of the fixing portion when the torque generated by the actuator is applied to the user's leg through the fixing portion, the processor 17 may output control signals to adjust driving of the drive portion installed to each fixing portion.

For example, the walking state of the right leg is changed such that the right leg is prepared to swing in a state of being supported on the ground from the fifth stage of walking to the eighth stage of walking and is then swung. In such a process, the first actuator 21a is driven in the counterclockwise direction in order to lift the user's leg. In this case, the first support portion 22a rotates in a direction of lifting the user's leg as shown in FIG. 5. Consequently, conventionally, the first fixing portion 23a may undesirably rotate in the counterclockwise direction by lifting force of the first support portion 22a. Conventionally, when the first fixing portion 23a rotates, a direction of force lifting the user's leg by the first fixing portion 23a is changed from a direction of force lifting the user's leg in a state in which the first fixing portion 23a is not rotated, as shown in FIG. 5.

To prevent the above described undesirable rotation, in some example embodiments, the processor 17 adjusts the driving directions of the first and second motors M1 and M2 of the first drive portion 24a so as to rotate the first fixing portion 23a in a direction opposite to the rotation direction, thereby allowing undesired rotation to be offset.

As shown in FIG. 5, when torque generated by the first actuator 21a acts in a direction of lifting the user's leg, the first fixing portion 23a rotates in the counterclockwise direction. In order to offset undesired rotation of the first fixing portion 23a, the processor 17 rotates the first fixing portion 23a in the clockwise direction by adjusting the driving directions of the motors of the first drive portion 24a, as shown in FIG. 8.

More specifically, when torque generated by the first actuator 21a acts in a direction of lifting the user's leg, all of the first and second motors M1 and M2 of the first drive portion 24a are driven in the counterclockwise direction by a certain angle. When all of the first and second motors M1 and M2 are driven in the counterclockwise direction, the first motor M1 pulls the first fixing portion 23a and the second motor M2 releases the first fixing portion 23a, thereby allowing the first fixing portion 23a to be wound toward the first motor M1. Accordingly, the first fixing portion 23a rotates in the clockwise direction.

When the first support portion 22a lifts the user's leg, the first fixing portion 23a rotates in the counterclockwise direction as described above. In this case, since the first fixing portion 23a rotates in the clockwise direction by the first drive portion 24a, rotation of the first fixing portion 23a in the counterclockwise direction is offset.

The processor 17 may determine the rotation directions of the first and second motors M1 and M2 in connection with the rotation direction of the first actuator 21a according to the walking state and may determine the angle of rotation in connection with the angle of rotation of the first fixing portion 23a by rotation of the actuator. The processor 17 controls the driving directions of the respective motors of the first drive portion installed to each fixing portion by corresponding to the respective driving directions of the actuator varying according to the change of the walking state.

In some example embodiments, the processor 17 may control in real time the driving directions and driving angles of the first and second motors M1 and M2 of each of the drive portions 24a, 33a, and 44 by corresponding to the change of the driving directions and driving angles of the actuators, thereby enabling rotation of the fixing portions to be offset.

In other example embodiments, the processor 17 control the driving directions and driving angles of the first and second motors M1 and M2 of the drive portion before the actuator is driven, by predicting an undesired rotation direction of the fixing portion through estimation of the periodically varying walking state and previously rotating the fixing portion in a direction opposite to the undesired rotation direction.

FIG. 12 is a flowchart illustrating a method of controlling a walking assistance apparatus according to some example embodiments.

Referring to FIG. 12, in operation 200, the processor 17 determines a walking state (operation 200) and, in operation S210, the processor 17 determines a driving direction of each actuator according to the determined walking state.

The processor 17 may determine the walking state and operation states of the hip joint, knee joint, and ankle joint or operation states of the actuator 21a, 31a, and 41a corresponding to the respective joints, based on information transferred from the first to third sensing portions 25, 35, and 45 and the first to third measurement portions 26, 36, and 46.

For example, the walking state of the right leg is changed such that the right leg is prepared to swing in a state of being supported on the ground from the fifth stage of walking to the eighth stage of walking and is then swung. Since the user's leg should be lifted in such a process, the processor 17 may determine a driving direction of the first actuator 21a in a direction of lifting the user's leg. Referring to FIG. 5, the driving direction of the first actuator 21a may be determined as the counterclockwise direction.

In operation 220, the processor 17 determines a rotation direction of the fixing portion 23 according to the driving direction of each actuator 21 so as to determine driving directions of the motors M1, M2 of the drive portion 24.

In operation 230, the processor 17 instructs the fixing portion 23 to rotate in a direction opposite to the determined rotation direction of the fixing portion 23. The motors M1, M2 of the drive portion 24 are driven in the determined driving directions so as to offset rotation of the fixing portion 23 according to driving of the actuator 21.

The processor 17 may determine operation states of the hip joint, knee joint, and ankle joint or operation states of the actuator 21a, 31a, and 41a corresponding to the respective joints, based on information transferred from the first to third sensing portions 25, 35, and 45 and the first to third measurement portions 26, 36, and 46.

In order to prevent undesired rotation of the fixing portion when the torque generated by the actuator is applied to the user's leg through the fixing portion, the processor 17 may output control signals to adjust driving of the drive portion installed to each fixing portion.

For example, the walking state of the right leg is changed such that the right leg is prepared to swing in a state of being supported on the ground from the fifth stage of walking to the eighth stage of walking and is then swung. In such a process, the first actuator 21a is driven in the counterclockwise direction on the drawing in order to lift the user's leg. In this case, the first support portion 22a rotates in a direction of lifting the user's leg as shown in FIG. 5. Consequently, the first fixing portion 23a undesirably rotates in the counterclockwise direction by lifting force of the first support portion 22a. When the first fixing portion 23a rotates, a direction of force lifting the user's leg by the first fixing portion 23a is warped from a direction of force lifting the user's leg in a state in which the first fixing portion 23a is not rotated, as shown in FIG. 5. To prevent this, the processor 17 may adjusts the driving directions of the first and second motors M1 and M2 of the first drive portion 24a so as to rotate the first fixing portion 23a in a direction opposite to the rotation direction, thereby allowing undesired rotation to be offset.

As shown in FIG. 5, when torque generated by the first actuator 21a acts in a direction of lifting the user's leg, the first fixing portion 23a rotates in the counterclockwise direction. In order to offset undesired rotation of the first fixing portion 23a, the processor 17 rotates the first fixing portion 23a in the clockwise direction by adjusting the driving directions of the motors of the first drive portion 24a, as shown in FIG. 8.

For example, when torque generated by the first actuator 21a acts in a direction of lifting the user's leg, all of the first and second motors M1 and M2 of the first drive portion 24a are driven in the counterclockwise direction by a certain angle. When all of the first and second motors M1 and M2 are driven in the counterclockwise direction, the first motor M1 pulls the first fixing portion 23a and the second motor M2 releases the first fixing portion 23a, thereby allowing the first fixing portion 23a to be wound toward the first motor M1. Accordingly, the first fixing portion 23a rotates in the clockwise direction. When the first support portion 22a lifts the user's leg, the first fixing portion 23a rotates in the counterclockwise direction as described above. In this case, since the first fixing portion 23a rotates in the clockwise direction by the first drive portion 24a, rotation of the first fixing portion 23a in the counterclockwise direction is offset. The processor 17 may determine the rotation directions of the first and second motors M1 and M2 in connection with the rotation direction of the first actuator 21a according to the walking state and may determine the angle of rotation in connection with the angle of rotation of the first fixing portion 23a by rotation of the actuator. The processor 17 controls the driving directions of the respective motors of the first drive portion installed to each fixing portion by corresponding to the respective driving directions of the actuator varying according to the change of the walking state.

In some example embodiments, the processor 17 controls in real time the driving directions and driving angles of the first and second motors M1 and M2 of the drive portion by corresponding to the change of the driving direction and driving angle of the actuator, thereby enabling rotation of the fixing portion to be offset. In other example embodiments, the processor 17 may control the driving directions and driving angles of the first and second motors M1 and M2 of the drive portion before the actuator is driven, by predicting an undesired rotation direction of the fixing portion through estimation of the periodically varying walking state and previously rotating the fixing portion in a direction opposite to the undesired rotation direction.

As is apparent from the above description, in accordance with a walking assistance apparatus and a method of controlling the same according to some example embodiments, it may be possible to prevent rotation of a fixing portion according to driving of an actuator so that assist power may be transferred to a user in a proper direction.

Although a few example embodiments have been shown and described, it would be appreciated by those skilled in the art that changes may be made in these embodiments without departing from the principles and spirit of the example embodiments, the scope of which is defined in the claims and their equivalents.

What is claimed is:

1. A walking assistance apparatus comprising:
   a support device configured to be worn by a user and to apply assist power to assist the user with walking;
   a clamp on an end of the support device, the clamp configured to clamp the support device on the user with an amount of tension, the clamp configured to receive a rotational force when the assist power is applied to the user;
   a driver including at least one motor, the motor configured to apply the tension to the clamp; and
   a processor configured to adjust a driving direction of at least one motor during rotation of the support device such that the driving direction counteracts the rotational force applied to the clamp.

2. The walking assistance apparatus according to claim 1, wherein the processor instructs a first one of the at least one motor to rotate in a direction of pulling the clamp during rotation of the support device and instructs a second one of the at least one motor to rotate in a direction of releasing the clamp.

3. The walking assistance apparatus according to claim 1, wherein the processor is configured to adjust a driving angle of the at least one motor such that the clamp rotates an angle in a direction opposite a direction of the rotational force.

4. The walking assistance apparatus according to claim 1, wherein the processor is configured to drive all of the at least one motor in a same direction so that the clamp rotates in a direction opposite to the driving direction.

5. The walking assistance apparatus according to claim 1, wherein the at least one motor includes a first motor attached to a first end of the clamp and a second motor attached to a second end of the clamp.

6. The walking assistance apparatus according to claim 5, wherein each of the first and second motors is configured to drive about a rotary axis that is parallel in an upward and downward direction.

7. The walking assistance apparatus according to claim 6, wherein when the support device rotates about a rotary axis that is parallel in a left and right direction, the processor is configured to rotate the first and second motors such that the first and second motors rotate about the rotary axis in a same direction as a rotation direction of the support device.

8. The walking assistance apparatus according to claim 5, wherein the processor is configured to drive the first and second motors in a direction of pulling the clamp so as to increase the tension.

9. The walking assistance apparatus according to claim 1, further comprising:
   an actuator configured to generate the assist power.

10. A method of controlling a walking assistance apparatus, the walking assistance apparatus including a support device configured to apply an assist power to a user, a clamp on one end of the support device, the clamp configured to clamp the support device on the user with an amount of tension and receive a rotational force when the assist power is applied to the user, and a driver including at least one motor, the motor configured to apply the tension to the clamp, the method comprising:
    determining a rotation direction of the support device; and
    adjusting a driving direction of the at least one motor during rotation of the support device such that the adjusted driving direction counteracts the rotational force applied to the clamp.

11. The method according to claim 10, wherein the determining a rotation direction of the support device comprises:
    determining a driving direction of an actuator which applies the assist power.

12. The method according to claim 10, wherein the adjusting a driving direction comprises:
    rotating a first one of the at least one motor in a direction of pulling the clamp during rotation of the support device and rotating a second one of the at least one motor in a direction of releasing the clamp.

13. The method according to claim 10, wherein the adjusting a driving direction comprises:
    adjusting a driving angle of the at least one motor such that the clamp rotates an angle in a direction opposite the rotational force.

14. The method according to claim 10, wherein the adjusting a driving direction comprises:
    driving all of the at least one motor in a same direction so that the clamp rotates in a direction opposite to the driving direction.

15. The method according to claim 10, wherein:
    the at least one motor includes a first and second motor, the first and second motor configured to be driven about a rotary axis that is parallel in an upward and downward; and
    the adjusting a driving direction comprises:
        rotating the first and second motors such that each of the first and second motors rotates about the rotary axis in a same direction as a rotation direction of the support device, when the support device rotates about an axis parallel in a left and right direction.

16. The method according to claim 10, further comprising:
    driving the at least one motor in a direction of pulling the clamp so as to increase the tension applied to the user.

* * * * *